(12) United States Patent
Ando (10) Patent No.: US 10,433,410 B2
(45) Date of Patent: Oct. 1, 2019

(54) X-RAY GENERATION APPARATUS AND X-RAY PHOTOGRAPHY SYSTEM

(71) Applicant: CANON ANELVA CORPORATION, Kawasaki-shi, Kanagawa (JP)

(72) Inventor: Yoichi Ando, Kawasaki (JP)

(73) Assignee: Canon Anelva Corporation, Kanagawa (JP)

(*) Notice: Subject to any disclaimer, the term of this patent is extended or adjusted under 35 U.S.C. 154(b) by 0 days.

(21) Appl. No.: 16/170,274

(22) Filed: Oct. 25, 2018

(65) Prior Publication Data

US 2019/0069384 A1   Feb. 28, 2019

Related U.S. Application Data

(63) Continuation of application No. PCT/JP2016/004771, filed on Oct. 31, 2016.

(51) Int. Cl.
*H05G 1/52* (2006.01)
*H05G 1/06* (2006.01)
(Continued)

(52) U.S. Cl.
CPC ............. *H05G 1/06* (2013.01); *G02B 6/442* (2013.01); *G02B 6/4429* (2013.01); *H05G 1/32* (2013.01); *H05G 1/54* (2013.01); *H01J 35/02* (2013.01)

(58) Field of Classification Search
CPC ...... H01J 35/02; H01J 35/30; H01J 2201/342; H01J 35/065; H01J 35/32; H01J 2235/164; H01J 35/08; H01J 35/06; H01J 35/116; H01J 35/18; H01J 2201/30469; H01J 2235/06; H01J 2235/062; H01J 2235/068; H05G 1/06; H05G 1/08; H05G 1/32; H05G 1/54; H05G 1/30; H05G 1/44; H05G 1/46; H05G 1/34; H05G 1/10; H05G 1/20;
(Continued)

(56) References Cited

U.S. PATENT DOCUMENTS 7,317,783 B2 * 1/2008 Dolgonos ................ H05G 1/20
                                                              378/101
9,111,655 B2   8/2015 Ohashi et al.
(Continued)

FOREIGN PATENT DOCUMENTS

JP   S56-096500   8/1981
JP   S59-132599   7/1984
(Continued)

*Primary Examiner* — Irakli Kiknadze
(74) *Attorney, Agent, or Firm* — Venable LLP (57) ABSTRACT

An X-ray generation apparatus includes an X-ray tube; a drive circuit that drives the X-ray tube; a voltage generation circuit that generates an electron acceleration voltage applied to the X-ray tube; and a control unit that communicates with the drive circuit, and at least the X-ray tube, the drive circuit, and the voltage generation circuit are arranged inside a storage container filled with an insulating oil. At least a part of a path connecting the drive circuit and the control unit is formed of an optical fiber cable arranged inside the storage container, and the optical fiber cable has electric field mitigation means for suppressing an electric field occurring due to a potential difference between the drive circuit and the control unit from locally concentrating along a longitudinal direction of the optical fiber cable.

8 Claims, 8 Drawing Sheets

(51) Int. Cl.
*H05G 1/32* (2006.01)
*G02B 6/44* (2006.01)
*H05G 1/54* (2006.01)
*H01J 35/02* (2006.01)

(58) Field of Classification Search
CPC .. H05G 1/26; H05G 1/36; H05G 1/52; G01N 23/223; G01N 2223/076; G01N 2223/615; G01N 2223/643; G01N 2223/652; G01N 33/15; G01N 23/20; G01B 11/043; G06N 3/08; G02B 6/442; G02B 6/4429
USPC ................................ 378/101, 110–114, 119
See application file for complete search history.

(56) References Cited

U.S. PATENT DOCUMENTS

| | | | |
|---|---|---|---|
| 9,980,357 B1 | 5/2018 | Kawase et al. | |
| 2002/0196900 A1* | 12/2002 | Dinsmore | A61N 5/1001 378/119 |
| 2003/0147498 A1* | 8/2003 | Hadland | H01J 35/045 378/119 |
| 2015/0036801 A1 | 2/2015 | Ohashi et al. | |

FOREIGN PATENT DOCUMENTS

| | | |
|---|---|---|
| JP | H08-138458 | 5/1996 |
| JP | H08-212948 | 8/1996 |
| JP | 2001-053295 | 2/2001 |
| JP | 2003-317996 | 11/2003 |

* cited by examiner

X-RAY GENERATION APPARATUS AND X-RAY PHOTOGRAPHY SYSTEM

CROSS-REFERENCE TO RELATED APPLICATIONS

This application is a continuation application of International Application PCT/JP2016/004771 filed on Oct. 31, 2016 and designated the U.S., the entire contents of which are incorporated herein by reference.

TECHNICAL FIELD

The present invention relates to an X-ray generation apparatus and an X-ray photography system.

BACKGROUND ART

As one of the industry non-destructive inspection apparatuses, X-ray photography systems are known. For example, an X-ray inspection apparatus having a micro-focus X-ray tube is used for inspection of electronic devices represented by semiconductor integrated circuit substrates. The X-ray tube is an X-ray source that applies a high voltage of a predetermined potential difference in accordance with X-ray energy between the anode and the cathode, irradiates a target with electrons accelerated by the high voltage, and thereby emits an X-ray from the target. The micro-focus X-ray tube is an X-ray tube having a plurality of grid electrodes on the cathode side and has a function of converging an orbit of an electron beam by controlling an electrostatic lens using a voltage applied to these grid electrodes.

In an X-ray generation apparatus using a micro-focus X-ray tube, a grounding scheme of the X-ray tube, a supply scheme of a control signal, and the like have been improved because of a need for controlling a voltage to be applied to grid electrodes. For example, the X-ray generation apparatus disclosed in Japanese Patent Application Laid-Open No. 2003-317996 is configured to supply, via an optical fiber cable, a control signal of the grid voltage to be applied to the grid electrodes and thereby be able to apply a negative high voltage to the cathode of the X-ray tube. Further, an enclosure of the X-ray tube is defined as the ground potential, a neutral point grounding scheme that applies positive and negative high voltages to the anode and the cathode is employed, and thereby the voltage applied between the enclosure and the anode is reduced in about half.

In terms of easier handling or the like in mounting an X-ray generation apparatus on an X-ray photography system, reduction in size of the X-ray generation apparatus is demanded. Further, in terms of higher penetrating power, increase in a voltage applied to an X-ray tube is demanded. However, study by the inventors has revealed for the first time that malfunction in a control system increases due to progress of reduction in size and increase in application voltage of the X-ray generation apparatus.

SUMMARY OF THE INVENTION

An object of the present invention is to provide an X-ray generation apparatus that can suppress malfunction of a control system due to progress of reduction in size or increase in application voltage. Further, another object of the present invention is to provide a reliable X-ray photography system that can stably acquire a captured image by using such an X-ray generation apparatus.

According to one aspect of the present invention, provided is an X-ray generation apparatus including an X-ray tube, a drive circuit that drives the X-ray tube, a voltage generation circuit that generates an electron acceleration voltage applied to the X-ray tube, and a control unit that communicates with the drive circuit, wherein at least the X-ray tube, the drive circuit, and the voltage generation circuit are arranged inside a storage container filled with an insulating oil, wherein at least a part of a path connecting the drive circuit and the control unit is formed of an optical fiber cable arranged inside the storage container, and wherein the optical fiber cable has electric field mitigation means for suppressing an electric field occurring due to a potential difference between the drive circuit and the control unit from locally concentrating along a longitudinal direction of the optical fiber cable.

DESCRIPTION OF THE EMBODIMENTS

First Embodiment

Figure 1:
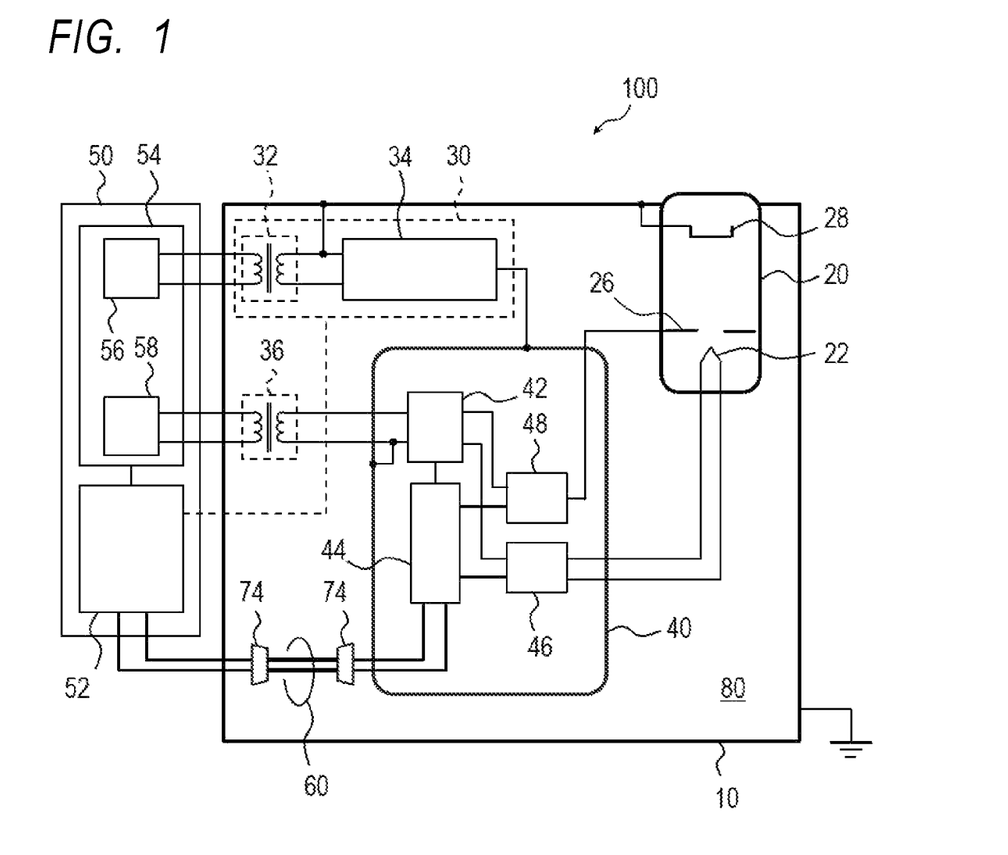
FIG. 1 is a block diagram illustrating a general configuration of an X-ray generation apparatus according to a first embodiment of the present invention.
Figure 2A:
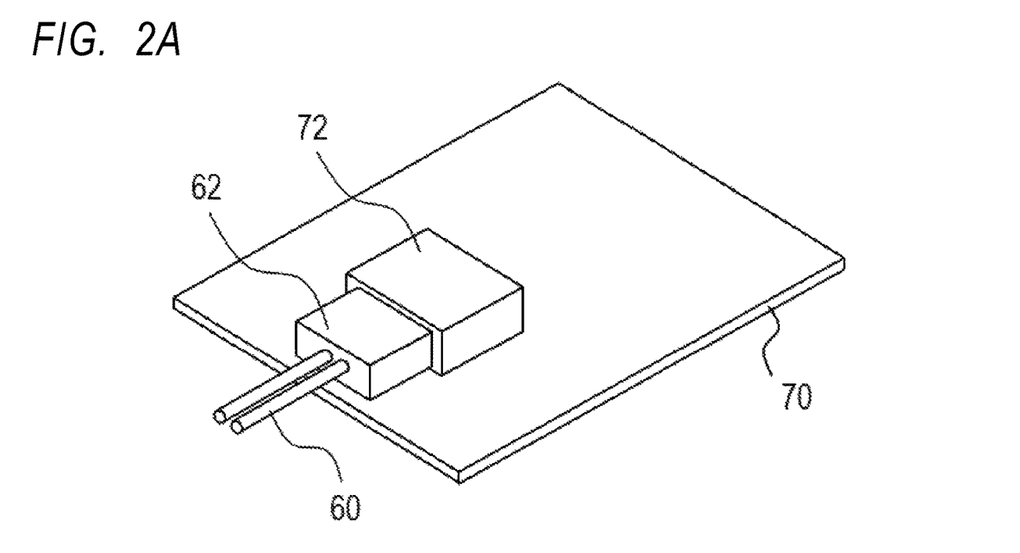
FIG. 2A and FIG. 2B are diagrams illustrating the structure of a connection part of an optical fiber cable that connects a control circuit to an electron gun drive circuit.
Figure 2B:
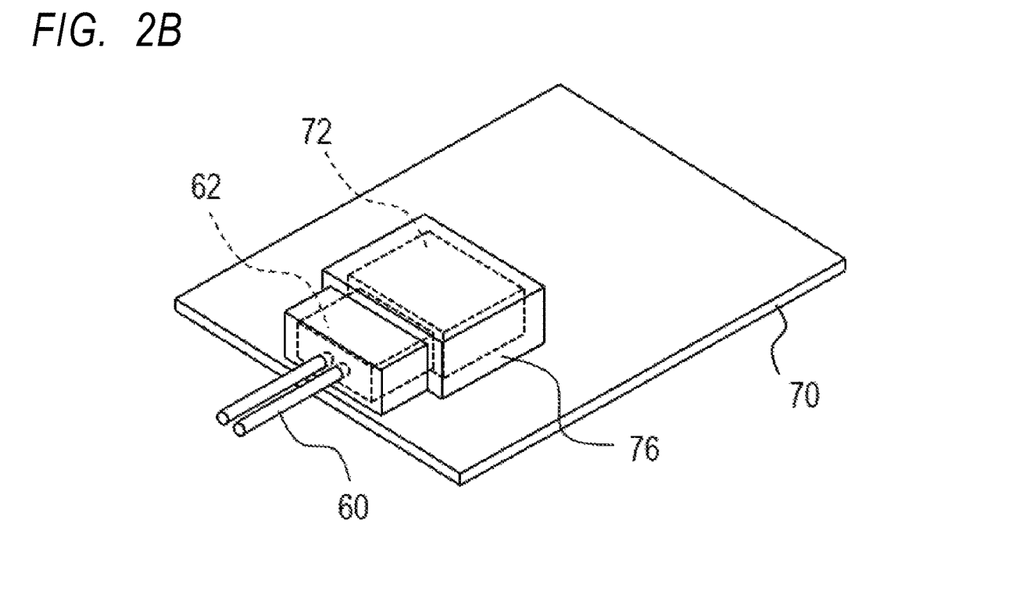
Figure 3A:
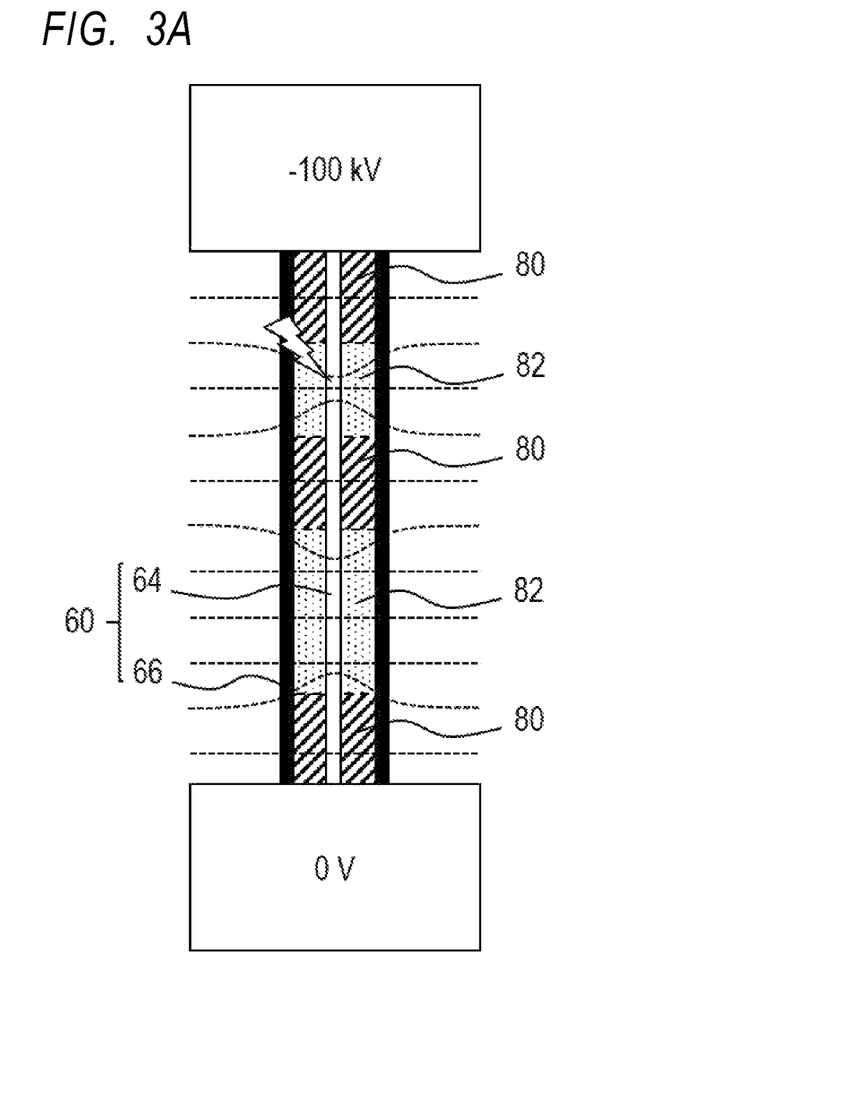
FIGS. 3A and 3B are diagrams illustrating influence of a residual gas inside the optical fiber cable.
Figure 3B:
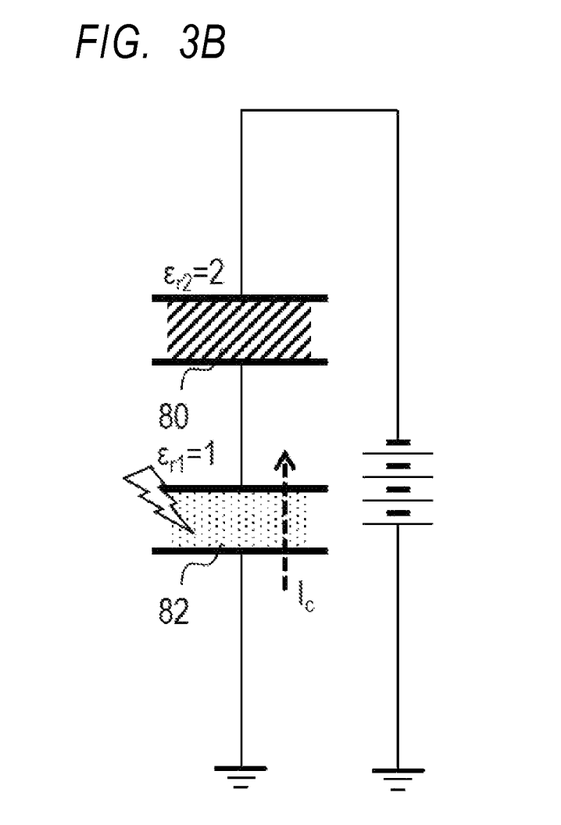
Figure 4:
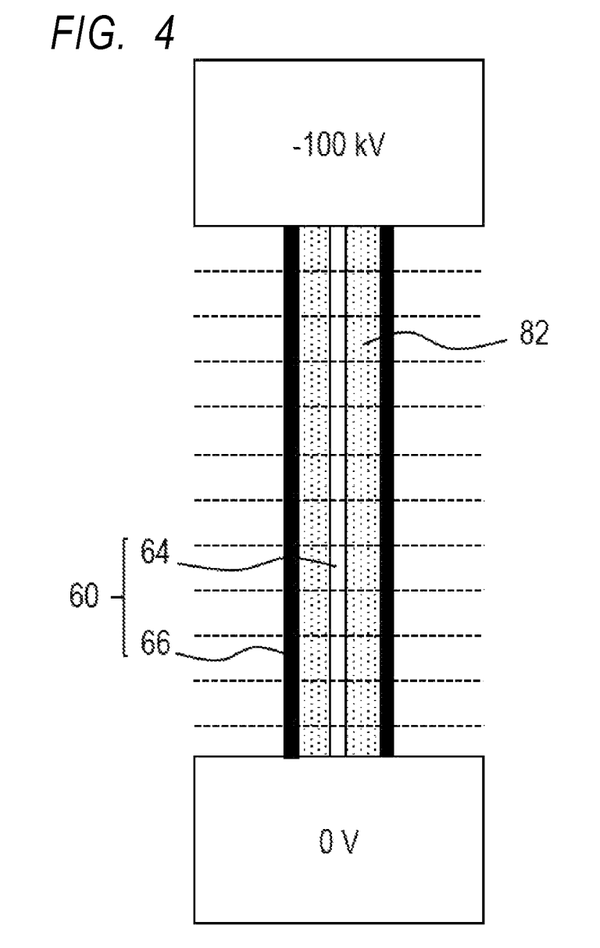
FIG. 4 is a schematic diagram illustrating the structure of the optical fiber cable of the X-ray generation apparatus according to the first embodiment of the present invention.

An X-ray generation apparatus according to a first embodiment of the present invention will be described with reference to FIG. 1 to FIG. 4. FIG. 1 is a block diagram illustrating a general configuration of the X-ray generation apparatus according to the present embodiment. FIGS. 2A and 2B are diagrams illustrating the structure of a connection part of an optical fiber cable that connects a control circuit to an electron gun drive circuit. FIGS. 3A and 3B are diagrams illustrating influence of a residual gas inside the optical fiber cable. FIG. 4 is a schematic diagram illustrating the structure of the optical fiber cable of the X-ray generation apparatus according to the present embodiment.

First, the structure of the X-ray generation apparatus according to the present embodiment will be described by using FIG. 1 to FIG. 2B.

As illustrated in FIG. 1, an X-ray generation apparatus 100 according to the present embodiment includes an X-ray tube 20, a high voltage generation circuit 30, an electron gun drive circuit 40, and a control unit 50. At least the X-ray tube 20, the high voltage generation circuit 30, and the electron gun drive circuit 40 are arranged inside a storage container 10. Inside the storage container 10, an insulating oil 80 is filled for ensuring a dielectric voltage among components arranged therein. As the insulating oil 80, an electrical insulating oil such as a mineral oil, silicone oil, a fluorine-based oil, or the like is preferable. For an X-ray generation apparatus using the X-ray tube 20 whose rated tube voltage is around 100 kV, a mineral oil that can be easily handled is preferably employed.

The X-ray tube 20 includes an electron source 22, a grid electrode 26, and an anode 28. The electron source 22 and the grid electrode 26 are connected to the electron gun drive circuit 40, and desired control voltages are applied thereto, respectively. The anode 28 is connected to the storage container 10 maintained at the ground potential. In the anode 28, a target (not illustrated) that generates an X-ray by irradiation of an electron ray is provided. Note that, while a single grid electrode 26 is depicted in FIG. 1, a plurality of grid electrodes 26 are typically provided.

The electron source 22 is not limited in particular, and a hot cathode such as a tungsten filament or an impregnated cathode or a cold cathode such as a carbon nanotube can be applied, for example. It is preferable that the material forming a target be a material having a high melting point and a high X-ray generation efficiency, and, for example, tungsten, tantalum, molybdenum, and alloy thereof or the like can be applied thereto. Note that, in the present specification, the electron source 22 and the grid electrode 26 may be collectively denoted as "electron gun."

Electrons emitted from the electron source 22 are accelerated by a high voltage with respect to the anode 28 to collide with the target provided in the anode 28, and thereby an X-ray is radiated from the target. The amount of the X-ray radiated from the target can be controlled by the amount of the electron ray irradiated on the target, that is, by a supplied current in the case of the hot cathode electron source 22. The orbit of an electron ray irradiated on the target can be controlled by a grid voltage applied to the grid electrode 26. In this sense, the electron source 22 and the grid electrode 26 correspond to a control mechanism that controls an electron ray emitted from the electron gun.

The high voltage generation circuit 30 includes a step-up transformer 32 and a step-up circuit 34. The step-up circuit 34 is a Cockcroft circuit, for example. The high voltage generation circuit 30 generates a negative high voltage to the storage container 10 held at the ground potential. The high voltage generation circuit 30 is connected to the electron gun drive circuit 40. The negative high voltage generated by the high voltage generation circuit 30 is applied to the electron gun drive circuit 40.

The electron gun drive circuit 40 includes a rectifier circuit 42, a logic circuit 44, an electron source drive circuit 46, and a grid voltage control circuit 48. The rectifier circuit 42 is connected to the logic circuit 44, the electron source drive circuit 46, and the grid voltage control circuit 48. Thereby, a voltage supplied to the rectifier circuit 42 via a high isolation transformer 36 can be rectified and supplied to the logic circuit 44, the electron source drive circuit 46, and the grid voltage control circuit 48. One of the input terminals of the rectifier circuit 42 is connected to the output terminal of the high voltage generation circuit 30. That is, in each circuit of the electron gun drive circuit 40, the negative potential supplied from the high voltage generation circuit is a reference potential of the electron gun drive circuit 40.

The electron source drive circuit 46 controls a voltage or a current supplied to the electron source 22 in accordance with a control signal supplied from a control circuit 52 via the logic circuit 44. The grid voltage control circuit 48 controls a grid voltage applied to the grid electrode 26 in accordance with a control signal supplied from the control circuit 52 via the logic circuit 44.

The control unit 50 include the control circuit 52 and an inverter circuit 54. The control circuit 52 is connected to the electron gun drive circuit 40 and the inverter circuit 54. The inverter circuit 54 includes an inverter 56 connected to the step-up transformer 32 arranged inside the storage container 10 and an inverter 58 connected to a high isolation transformer 36 arranged inside the storage container 10. The control circuit 52 supplies a predetermined control signal to the electron gun drive circuit 40 and the inverter circuit 54. The inverter circuit 54 controls the inverters 56 and 58 in accordance with a control signal supplied from the control circuit 52 and supplies predetermined drive voltages to step-up transformer 32 and the high isolation transformer 36. The control circuit 52 monitors the output voltage of the high voltage generation circuit 30 and adjusts a drive voltage of the step-up transformer 32 by a control signal supplied to the inverter circuit 54 such that the output voltage of the high voltage generation circuit 30 is a predetermined voltage.

As illustrated in FIG. 1, the control unit 50 and the high voltage generation circuit 30 are connected to each other via the step-up transformer 32, that is, isolated from each other. Similarly, the control unit 50 and the electron gun drive circuit 40 are connected to each other via the high isolation transformer 36, that is, isolated from each other. In an example, the control unit 50 is connected to the ground potential. Further, the electron gun drive circuit 40 is connected to the high voltage generation circuit 30. Thus, a potential difference corresponding to the negative high voltage generated by the high voltage generation circuit 30 via the step-up transformer 32 occurs between the control unit 50 and the electron gun drive circuit 40. That is, an electric field occurs between the control unit 50 and the electron gun drive circuit 40.

In the path responsible for mutual communication between the control circuit 52 and the electron gun drive circuit 40, a part of the path at least within the storage container 10 is formed of an optical fiber cable 60 in order to maintain electric isolation. This allows for controlling the electron source drive circuit 46 and the grid voltage control circuit 48 within the electron gun drive circuit 40 that operates based on the negative potential supplied from the high voltage generation circuit 30 as a reference potential by using a control signal from the control circuit 52 that operates based on the ground potential as a reference potential. The optical fiber cable 60 is connected to the control circuit 52 and the logic circuit 44 via a photoelectric conversion device 74. Note that a reference potential is a potential handled as a reference in each circuit.

Here, in the X-ray generation apparatus 100 according to the present embodiment, the optical fiber cable 60 has electric field mitigation means for suppressing local concentration of the electric field along the longitudinal direction thereof. Note that electric field mitigation as used herein means mitigation of an electric field strength.

The optical fiber cable 60 has an optical connector 62 at the end thereof and is optically connected to an optical connector 72 provided on a circuit substrate 70, as illustrated in FIG. 2A, for example. The optical connector provided on the circuit substrate 70 has the photoelectric conversion device 74 and converts an electric signal into an optical signal to output the optical signal to the optical fiber cable 60 or converts an optical signal from the optical fiber cable 60 into an electrical signal.

In the present embodiment, as illustrated in FIG. 2B, a seal structure 76 is provided so as to seal a connection portion between the optical connector 62 provided to the optical fiber cable 60 and the optical connector 72 provided on the circuit substrate 70. The seal structure is for preventing the insulating oil from permeating into the optical connection part between the optical fiber cable 60 and the photoelectric conversion device 74 or permeating inside the coating of the optical fiber cable 60. The seal structure 76 provided in such a way corresponds to the electric field mitigation means in the optical fiber cable 60 of the present embodiment. The seal structure 76 can be formed by applying and curing a resin material such as an epoxy resin after connecting the optical connector 62 to the optical connector 72, for example.

The reason why the seal structure 76 as the electric field mitigation means is provided in the optical fiber cable 60 of the present embodiment will be described below.

As described above, along with progress of reduction in size and increase in a voltage applied to the X-ray generation apparatus, malfunction of a control system that controls the electron source drive circuit 46 or the grid voltage control circuit 48 by using the control circuit 52 has become apparent. Study by the present inventors has revealed that this malfunction is caused because a sudden change of the electric field occurs along the longitudinal direction of the optical fiber cable 60 inside the optical fiber cable 60.

A typical optical fiber cable has the structure in which a coating is provided around the optical fiber made of only a core and a clad. In the optical fiber cable having such structure, a gas may be present between the optical fiber and the coating. For example, in an optical fiber cable having a two-layer structure coating of a primary coating made of glass fibers and a secondary coating (outer coat) made of a resin-based material, a gas is present inside the primary coating. In the optical fiber cable 60 having such structure, when a connection part between the optical connector 62 and the optical connector 72 is not sealed, the insulating oil 80 may permeate inside the coating of the optical fiber cable 60 and a gas may remain locally inside the optical fiber cable 60. The presence of such a residual gas inside the optical fiber cable 60 causes the electric field to concentrate at that part and a partial discharge to occur, and a high frequency current following a sudden capacitance change flows into the control circuit 52 through the circuit substrate 70 on the ground potential side, which causes a malfunction of a control system.

FIG. 3 is a diagram schematically illustrating an electric field distribution along the longitudinal direction of the optical fiber cable 60 when a residual gas is locally present inside the optical fiber cable 60. FIG. 3A illustrates a state where the insulating oil 80 permeates between the optical fiber 64 and the coating 66 of the optical fiber cable 60 and a gas 82 remains in a part thereof. FIG. 3B illustrates an equivalent circuit at this time.

The relative dielectric constant of the insulating oil 80 ($\varepsilon_{r2}$=around 2 to 3) is around two to three times the relative dielectric constant of the gas 82 ($\varepsilon_{r1}$=1). Thus, a spacing of the equal potential plane along the longitudinal direction of the optical fiber cable 60 (illustrated by dotted lines in the drawing) when there is a potential difference between both ends of the optical fiber cable 60 (100 kV is expected in the drawing) is narrower in the portion of the gas 82 than in the portion of the insulating oil 80. That is, the electric field concentrates at the portion of the gas 82. As a result, discharge occurs locally at the portion of the gas 82, and a high frequency current in the control system due to the discharge current $I_c$ causes a malfunction. Discharge in the portion of the gas 82 is likely to occur for a shorter optical fiber cable 60 or a larger potential difference. That is, it becomes apparent due to an attempt for reduction in size or increase in voltage of an X-ray generation apparatus for easier handling or higher penetrating power.

In such a point of view, in the X-ray generation apparatus according to the present embodiment, the seal structure 76 is provided so as to seal the connection part between the optical connector 62 provided to the optical fiber cable 60 and the optical connector 72 provided on the circuit substrate 70. With such a configuration, as illustrated in FIG. 4, for example, the insulating oil 80 no longer permeates into the optical fiber cable 60, and it is possible to prevent the gas 82 from locally remaining via the insulating oil 80 within the optical fiber cable 60. This can suppress a sudden change in the electric field along the longitudinal direction of the optical fiber cable 60 to prevent a malfunction of the control system.

Note that providing the seal structure 76 to the connection part between the optical connector 62 and the optical connector 72 has an advantage of suppressing influence of the insulating oil 80 on the optical coupling part between the optical fiber and the photoelectric conversion device in addition to preventing permeation of the insulating oil 80 into the optical fiber cable 60.

It is desirable that, in terms of continuously preventing permeation of the insulating oil 80 into the optical fiber cable 60, the material forming the coating (outer coat) of the optical fiber cable 60 and the seal structure 76 be a material which does not change in quality even with application of a high voltage in the insulating oil 80. The material which does not change in quality even with application of a high voltage in the insulating oil 80 may be, for example, a resin material containing no plasticizer or a fluorine resin such as an epoxy resin, a polytetrafluoroethylene, for example.

As discussed above, according to the present embodiment, since the seal structure 76 is provided to the connection part between the optical connector 62 and the optical connector 72, this can suppress local concentration of the electric field along the longitudinal direction of the optical fiber cable 60 and reduce malfunction of the control system. This enables further reduction in size and increase in application voltage of an X-ray generation apparatus.

Second Embodiment

Figure 5:
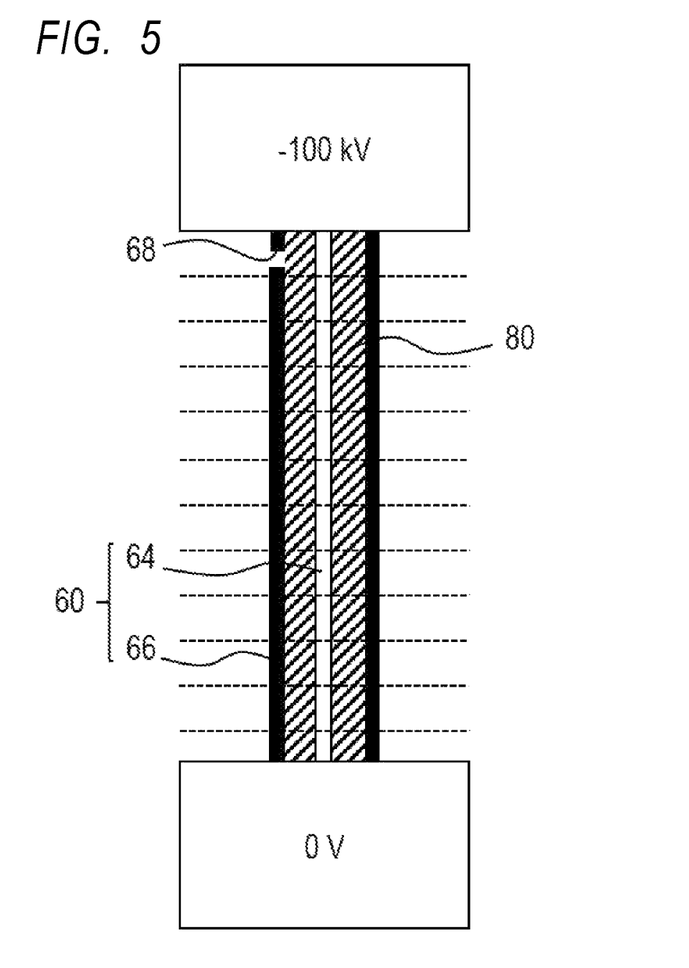
FIG. 5 is a schematic diagram illustrating the structure of an optical fiber cable of an X-ray generation apparatus according to a second embodiment of the present invention.

An X-ray generation apparatus according to a second embodiment of the present invention will be described with reference to FIG. 5. FIG. 5 is a schematic diagram illustrating the structure of an optical fiber cable of the X-ray generation apparatus according to the present embodiment.

While the optical fiber cable 60 is configured to prevent permeation of the insulating oil 80 into the optical fiber cable 60 in the first embodiment, it is possible to suppress local concentration of the electric field also by configuring it to positively replace the gas inside the optical fiber cable 60 with the insulating oil 80.

That is, in the optical fiber cable 60 of the X-ray generation apparatus according to the present embodiment, an opening 68 that is responsible for discharge of a gas and permeation of the insulating oil 80 is provided in the coating 66, as illustrated in FIG. 5, for example. The opening 68 provided in such a way corresponds to the electric field mitigation means in the optical fiber cable 60 of the present embodiment.

By providing the opening 68 in the coating 66 of the optical fiber cable 60, it is possible to facilitate discharge of a gas inside the optical fiber cable 60 and permeation of the insulating oil 80 into the optical fiber cable 60 and suppress the gas from remaining inside the optical fiber cable 60. Since electric field concentration inside the optical fiber cable 60 is caused by a gas remaining locally, it is possible to suppress electric field concentration inside the optical fiber cable 60 and thus prevent a malfunction of the control system by reducing a residual gas inside the optical fiber cable 60.

The location of the opening 68 is not limited in particular as long as it is a place that enables discharge of a gas inside the optical fiber cable 10 and permeation of the insulating oil 80 into the optical fiber cable 60. For example, it may be arranged in the middle of the optical fiber cable 60 or may be arranged near the connection part between the optical fiber cable 60 and the optical connector 62. Further, as far as the strength required for the optical fiber cable 60 is not lost, the number or the size of the opening 68 can be selected as appropriate so that a gas inside the optical fiber cable 60 can be quickly discharged and the insulating oil 80 can be easily permeated. Further, the opening 68 is not necessarily required to be provided in a part of the optical fiber cable 60, but may be provided to expose the entire optical fiber 64. That is, the coating 66 of the optical fiber cable 60 may be eliminated.

In order to effectively realize permeation of the insulating oil 80 into the optical fiber cable 60, it is preferable to apply vacuum impregnation, which injects insulating oil 80 after vacuuming the storage container 10, for filling the insulating oil 80 inside the storage container 10. With the use of vacuum impregnation, a gas inside the optical fiber cable 60 can be easily and reliably replaced with the insulating oil 80.

A formation method of the opening 68 is not limited in particular, for example, a general method such as providing a notch in the coating 66 by using a cutter can be implemented.

As discussed above, according to the present embodiment, since the opening 68 that is responsible for discharge of a gas and permeation of the insulating oil 80 is provided in the coating 66 of the optical fiber cable 60, this can suppress local concentration of the electric field along the longitudinal direction of the optical fiber cable and reduce malfunction of the control system. This enables further reduction in size and increase in application voltage of an X-ray generation apparatus.

Third Embodiment

Figure 6:
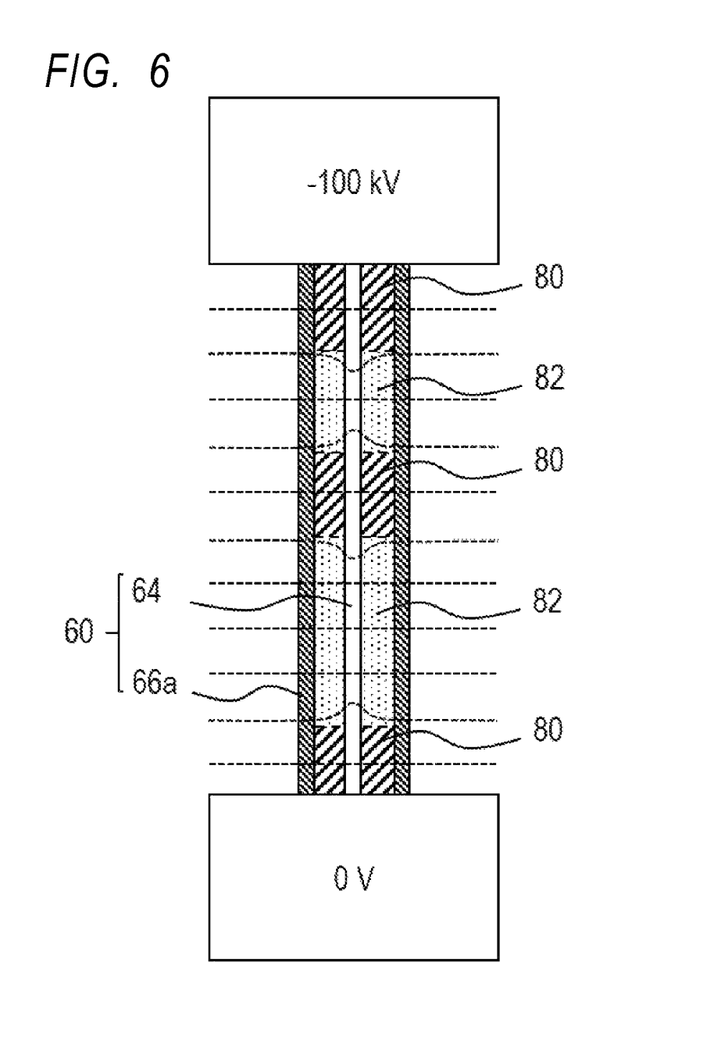
FIG. 6 is a schematic diagram illustrating the structure of an optical fiber cable of an X-ray generation apparatus according to a third embodiment of the present invention.

An X-ray generation apparatus according to a third embodiment of the present invention will be described by using FIG. 6. FIG. 6 is a schematic diagram illustrating the structure of an optical fiber cable of the X-ray generation apparatus according to the present embodiment.

In the optical fiber cable 60 of the X-ray generation apparatus according to the present embodiment, as illustrated in FIG. 6, the coating (coating 66a) of the optical fiber cable 60 is formed of a high-resistance material. With the coating 66a of the optical fiber cable 60 being formed of a high-resistance material, the electric field in the longitudinal direction of the optical fiber cable 60 can be made uniform by an electric field formed by a current flowing in the coating. The coating 66a made of a high-resistance material corresponds to the electric field mitigation means in the optical fiber cable 60 of the present embodiment.

With the coating 66a being formed of a high-resistance material, a current corresponding to a value resulted by dividing an acceleration voltage of an electron ray by the resistance value of the coating 66a can flow in the coating 66a, which allows for a uniform electric field in the longitudinal direction of the optical fiber cable 60. For this purpose, the resistance value of the material forming the coating 66a is set within a desired range in accordance with a potential specification and power consumption. The sheet resistance of the coating 66a is preferably less than or equal to $10^{14} \Omega/\square$, more preferably less than or equal to $10^{12} \Omega/\square$, and the most preferably less than or equal to $10^{11} \Omega/\square$ in terms of the potential specification. While depending on the acceleration voltage and the length of the optical fiber cable 60, the lower limit of the sheet resistance of the coating 66a is preferably greater than or equal to $10^5 \Omega/\square$, and more preferably greater than or equal to $10^7 \Omega/\square$ in order to suppress power consumption.

For example, when the optical fiber cable 60 having a diameter of 2 mm and a length of 300 mm is used, the sheet resistance of the coating 66a can be set to around $5 \times 10^{10} \Omega/\square$. In this case, the current flowing when the acceleration voltage is 100 kV is around 1 μA, which is appropriate in terms of the potential specification and power consumption.

While not limited in particular, the coating 66a made of a high-resistance material may be, for example, a resin material into which a carbon-based material such as a carbon black is kneaded. In this example, adjustment of the resistance value is possible by changing the addition amount of the carbon-based material.

As discussed above, according to the present embodiment, since the coating 66a of the optical fiber cable 60 is formed of a high-resistance material, this can suppress local concentration of the electric field along the longitudinal direction of the optical fiber cable 60 and reduce malfunction of the control system. This enables further reduction in size and increase in application voltage of an X-ray generation apparatus.

Fourth Embodiment

Figure 7:
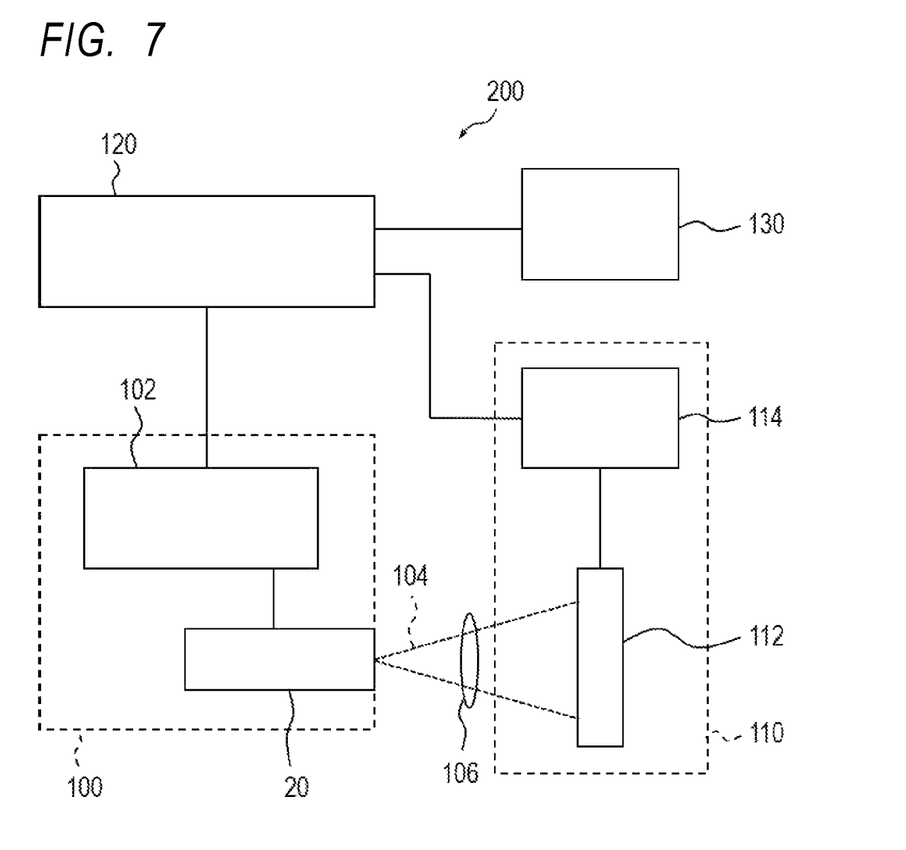
FIG. 7 is a block diagram illustrating a general configuration of an X-ray photography system according to a fourth embodiment of the present invention.

An X-ray photography system according to a fourth embodiment of the present invention will be described by using FIG. 7. FIG. 7 is a block diagram illustrating a general configuration of the X-ray photography system according to the present embodiment.

In the present embodiment, the X-ray photography system using the X-ray generation apparatus according to the first to third embodiments is illustrated.

As illustrated in FIG. 7, an X-ray photography system 200 according to the present embodiment includes the X-ray generation apparatus 100, an X-ray detection apparatus 110, a system control apparatus 120, and a display apparatus 130.

The X-ray generation apparatus 100 is any of the X-ray generation apparatuses of the first to third embodiments and includes the X-ray tube 20 and an X-ray tube drive circuit 102. The X-ray drive circuit 102 includes the high voltage generation circuit 30, the electron gun drive circuit 40, the control unit 50, and the like of the X-ray generation apparatus of the first to third embodiments. The X-ray detection apparatus 110 includes an X-ray detector 112 and a signal processing unit 114. The system control apparatus 120 is responsible for the control of the entire system including the X-ray generation apparatus 100 and the X-ray detection apparatus 110. The display apparatus 130 displays an image signal processed by the system control apparatus 120 on a screen.

The X-ray tube drive circuit 102 of the X-ray generation apparatus 100 outputs various control signals to the X-ray tube 20 under the control by the system control apparatus 120. The emission state of an X-ray emitted from the X-ray generation apparatus 100 is controlled by the control signal output from the system control apparatus 120.

An X-ray 104 emitted from the X-ray generation apparatus 100 transmits a subject 106 and is detected by the X-ray detector 112. The X-ray detector 112 has a plurality of not-illustrated detection devices and acquires a transmission X-ray image. The X-ray detector 112 converts the acquired transmission X-ray image into an image signal and outputs it to the signal processing unit 114. Between the X-ray tube 20 and the subject 106, a not-illustrated slit, a collimator, or the like may be arranged in order to suppress unnecessary X-ray irradiation.

The signal processing unit 114 applies predetermined signal processing to an image signal under the control by the system control apparatus 120 and outputs the processed image signal to the system control apparatus 120. Based on the processed image signal, the system control apparatus 120 outputs, to the display apparatus 130, a display signal for displaying an image on the display apparatus 130. The display apparatus 130 displays a captured image of the subject 106 based on the display signal on the screen.

As discussed above, according to the present embodiment, with the use of the X-ray generation apparatus 100 according to the first to third embodiment that is compact and superior in the discharge withstanding voltage property, the reliable X-ray photography system 200 that can stably acquire a captured image can be realized.

Modified Embodiment

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention. For example, the coating 66 of the optical fiber cable 60 of the X-ray generation apparatus according to the first or second embodiment may be formed of the coating 66a of the third embodiment. Further, the opening 68 of the second embodiment may be provided in the coating 66a of the optical fiber cable 60 of the X-ray generation apparatus according to the third embodiment.

Further, while the grounding scheme of the X-ray tube is the anode grounding scheme in the embodiments described above, the grounding scheme of the X-ray tube 20 is not limited to the anode grounding scheme. For example, a neutral point grounding scheme in which a positive high voltage and a negative high voltage are applied to the anode and the cathode of the X-ray tube, respectively, may be employed. The present invention can be widely applied to X-ray generation apparatuses that include an optical fiber cable in a part of a propagation path of a control signal and have a configuration with a large potential difference between both ends of the optical fiber cable.

Note that all the above embodiments merely illustrate examples of embodiment in implementing the present invention, and the technical scope of the present invention should not be construed in a limiting sense by these embodiments.

That is, the present invention can be implemented in various forms without departing from the technical concept or the primary features thereof.

What is claimed is:

1. An X-ray generation apparatus, comprising:
    an X-ray tube;
    a drive circuit that drives the X-ray tube;
    a voltage generation circuit that generates an electron acceleration voltage applied to the X-ray tube; and
    a control unit that communicates with the drive circuit, wherein
    at least the X-ray tube, the drive circuit, and the voltage generation circuit are arranged inside a storage container filled with an insulating oil,
    at least a part of a path connecting the drive circuit and the control unit is formed of an optical fiber cable arranged inside the storage container, and
    the optical fiber cable has electric field mitigation means for suppressing an electric field occurring due to a potential difference between the drive circuit and the control unit from locally concentrating along a longitudinal direction of the optical fiber cable.

2. The X-ray generation apparatus according to claim 1, wherein the optical fiber cable includes an optical fiber and a coating covering the optical fiber, and
    the electric field mitigation means includes an opening provided in the coating.

3. The X-ray generation apparatus according to claim 2, wherein the opening is configured to facilitate discharge of a gas inside the optical fiber cable and permeation of the insulating oil into the optical fiber cable, and
    a gas inside the optical fiber cable is replaced with the insulating oil.

4. The X-ray generation apparatus according to claim 1, wherein the path includes a photoelectric conversion device optically connected to the optical fiber cable, and
    the electric field mitigation means includes a seal structure that seals a connection part between the optical fiber cable and the photoelectric conversion device.

5. The X-ray generation apparatus according to claim 4, wherein the optical fiber cable has an optical fiber and a coating covering the optical fiber, and
    the seal structure prevents the insulating oil from permeating into the optical fiber cable.

6. The X-ray generation apparatus according to claim 1, wherein the optical fiber cable includes an optical fiber and a coating comprising a high-resistance material covering the optical fiber, and
    the electric field mitigation means is the coating.

7. The X-ray generation apparatus according to claim 6, wherein a resistance value of the coating is set so as to mitigate local concentration of an electric field inside the optical fiber cable by using a current flowing in the coating along the longitudinal direction.

8. An X-ray photography system, comprising:
    the X-ray generation apparatus according to claim 1;
    an X-ray detection apparatus that detects an X-ray emitted from the X-ray generation apparatus and transmitting a subject; and
    a signal processing unit that converts a transmission X-ray image from the subject detected by the X-ray detection apparatus into an image signal.

* * * * *